United States Patent
McNea et al.

(10) Patent No.: US 9,378,505 B2
(45) Date of Patent: Jun. 28, 2016

(54) AUTOMATED MULTIVARIATE TESTING TECHNIQUE FOR OPTIMIZED CUSTOMER OUTCOME

(75) Inventors: Blair William McNea, Boulder, CO (US); Colin Campbell, Erie, CO (US); Steven Vanderburg, Longmont, CO (US)

(73) Assignee: RevGuard, LLC, Longmont, CO (US)

( * ) Notice: Subject to any disclaimer, the term of this patent is extended or adjusted under 35 U.S.C. 154(b) by 638 days.

(21) Appl. No.: 13/190,289

(22) Filed: Jul. 25, 2011

(65) Prior Publication Data

US 2012/0022938 A1    Jan. 26, 2012

Related U.S. Application Data

(60) Provisional application No. 61/367,785, filed on Jul. 26, 2010.

(51) Int. Cl.
G06Q 30/00 (2012.01)
G06Q 30/02 (2012.01)

(52) U.S. Cl.
CPC ............ *G06Q 30/01* (2013.01); *G06Q 30/0243* (2013.01); *G06Q 30/0244* (2013.01)

(58) Field of Classification Search
USPC .................................. 705/14, 14.42, 14.43
See application file for complete search history.

(56) References Cited

U.S. PATENT DOCUMENTS

| | | | |
|---|---|---|---|
| 6,697,460 B2 | 2/2004 | Knott et al. | |
| 6,956,941 B1 | 10/2005 | Duncan et al. | |
| 7,043,435 B2 | 5/2006 | Knott et al. | |
| 7,170,993 B2 | 1/2007 | Anderson et al. | |
| 7,386,485 B1* | 6/2008 | Mussman et al. | 705/14.1 |
| 7,712,019 B1* | 5/2010 | Roderick | 715/205 |
| 8,103,544 B2* | 1/2012 | Mehta et al. | 705/14.42 |
| 8,208,608 B2* | 6/2012 | Simpson et al. | 379/88.01 |
| 8,296,182 B2* | 10/2012 | Chari et al. | 705/14.43 |
| 8,335,716 B2* | 12/2012 | Pradeep et al. | 705/14.41 |
| 8,392,254 B2* | 3/2013 | Pradeep et al. | 705/14.42 |
| 8,392,255 B2* | 3/2013 | Pradeep et al. | 705/14.42 |
| 2001/0011228 A1 | 8/2001 | Shenkman | |
| 2004/0024608 A1* | 2/2004 | Saenz et al. | 705/1 |
| 2005/0195966 A1 | 9/2005 | Adar et al. | |
| 2008/0313571 A1* | 12/2008 | Bushey et al. | 715/853 |
| 2009/0030755 A1* | 1/2009 | Altberg et al. | 705/7 |
| 2009/0171729 A1 | 7/2009 | Anisimov et al. | |
| 2009/0240561 A1* | 9/2009 | Altberg et al. | 705/10 |
| 2010/0010867 A1* | 1/2010 | Harper | 705/10 |
| 2010/0017263 A1* | 1/2010 | Zernik et al. | 705/10 |

(Continued)

OTHER PUBLICATIONS

Miyazaki, Jun., "Discussion Board System with modality variation: From Multimodality to User Freedom", Jul. 2002, Tampere University.*

(Continued)

*Primary Examiner* — Namrata Boveja
*Assistant Examiner* — Robert C Johnson
(74) *Attorney, Agent, or Firm* — Swanson & Bratschun, L.L.C.

(57) ABSTRACT

Novel tools and techniques to optimize, from a merchant's perspective, the outcomes of interactions between the merchant and its customers (whether existing, new, or potential customers). In an aspect, certain embodiments allow for multiple variations of options (multivariate or A/B testing) and outcomes which can be statistically applied and then measured and analyzed for best economic impact or preferred outcome.

28 Claims, 8 Drawing Sheets

(56) References Cited

U.S. PATENT DOCUMENTS

2010/0049538 A1* 2/2010 Frazer et al. ............... 705/1
2011/0125570 A1* 5/2011 Schultz ................ 705/14.42

OTHER PUBLICATIONS

"Delivering Appropriate Advice and Product Solutions that Meet Customer Needs", Oct. 2007, IP.com, IPCOM000159260D.*

Canadian Customer Contact Centre Industry, "Strategic Human Resources Study for the Canadian Customer Contact Centre Industry", Jun. 2002.*

Genesys, "Customer Service Strategies for the Retail Banking Industry", Mar. 2009.*

Evangelos Xevelonakis, "Managing Event-Driven Customer Relationships in Telecommunications", Jul. 2008.*

* cited by examiner

AUTOMATED MULTIVARIATE TESTING TECHNIQUE FOR OPTIMIZED CUSTOMER OUTCOME

CROSS-REFERENCES TO RELATED APPLICATIONS

This application claims the benefit, under 35 U.S.C. §119 (e), from provisional U.S. Patent Application No. 61/367,785 filed Jul. 26, 2010, by McNea et al. and titled "Automated Multivariate Testing Technique for Optimized Customer Outcome," which is hereby incorporated by reference, as if set forth in full in this document, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to customer relations management, and more particularly, to automated techniques for optimizing outcomes of customer interactions.

BACKGROUND

Customer relations management ("CRM") plays an ever-increasing role in commerce. To be successful, a merchant (a term that is used herein to describe any entity that engages in a commercial relationship with a customer) must attempt to satisfy existing customers and attract new customers. Merchants employ a wide variety of strategies to accomplish these goals, and many place a strong focus on direct, individualized communication with customers (who might be existing customers, new customers, or even potential customers).

As technology has advanced, some merchants have attempted to take advantage of these advancements, using systems such as interactive voice response ("IVR") systems to manage telephone communications with customers, electronic mail ("email") communications to reach potential customers or solidify relationships with new or existing customers, and web-based communications to provide marketing information, sales channels, and post-sale support. These modes of communications are but a few examples, but they all share a common characteristic: they employ technology to automate the process of customer communications, and in so doing, provide the merchant with enhanced efficiency.

In many cases, however, this enhanced efficiency comes at a price: customer satisfaction. Across many industries, customers have voiced dissatisfaction with their interactions with merchant technology. For example, email spam has become a frustration for many consumers. Likewise, customers attempting to navigate complex web sites or arcane IVR decision trees often experience enough frustration to negatively affect their impression of the merchant itself. This situation is problematic from the perspective of either the merchant or the customer.

This problem becomes particularly acute in the case of a customer who is dissatisfied with a product and seeks redress from the merchant. Already frustrated, the customer is likely to become even more hostile to the merchant if forced to endure an exasperating interaction with a merchant web site or IVR system. In many cases, this hostility can result in the loss of the customer. Research has been done in an attempt to make such interactions less frustrating for the consumer (and therefore less likely to result in the loss of that customer to the merchant), but the efficacy of such strategies is largely unknown.

Conversely, while the merchant does not want to provoke hostility in the customer, the merchant often would like to save the sale, if possible, or obtain some other outcome more favorable than the customer merely returning the product for a full refund, which, depending on the nature of the product, could result in a complete loss for the merchant (e.g., if the product is a consumable) and/or the loss of the return shipping costs. Thus, in many cases, a merchant would prefer to be able to reach some sort of compromise solution with the customer, leaving the customer at least relatively happy but also producing an outcome that is optimal for the merchant, under the circumstances.

To date, however, merchants have not had the tools to identify communication strategies that maximize the probability of obtaining such an optimal outcome. In fact, many merchants even have difficulty in identifying what such an optimal outcome would be, under a given set of circumstances.

Thus, there is a need for tools and techniques that would provide a merchant with insight into customer communication strategies that maximize the probability of an optimal outcome from the interaction with the customer, whether the customer is an existing customer, a new customer, or a potential customer. It would be beneficial if such tools and techniques could be applied across a variety of communication modes, such as human-to-human interactions, IVR interactions, web interactions, and/or the like.

BRIEF SUMMARY

A set of embodiments provides tools and techniques to optimize, from the merchant's perspective, the outcomes of interactions between the merchant and its customers (whether existing, new, or potential customers). In an aspect, certain embodiments allow for multiple variations of options (multivariate or A/B testing) and outcomes which can be statistically applied and then measured and analyzed for best economic impact or preferred outcome. In various embodiments, optimization of customer interaction outcomes includes, without limitation, decreasing customer returns and refund rates, increasing revenue per customer on an average basis, decreasing customer complaints and credit card charge backs, and/or other actions desired by a user or merchant. Such tools and techniques can be employed across a wide variety of communication channels, including without limitation, IVR, web, live customer service representative ("CSR"), email, chat, and/or the like.

In another aspect of certain embodiments, customer interactions might be defined as a series of modular prompts, which could be presented, e.g., by an IVR system, a web application, a human CSR (perhaps reading from a computer-generated script), a series of email or chat messages, and/or the like. Each prompt might include a message presented to a customer, a series of options a customer can select, a number of predefined outcomes (e.g., based on the customer's selected option), and a series of links to additional modules based on the selected options and/or customer-specific information (e.g., demographic information, purchase history, etc.). In some embodiments, prompts can be arranged into predefined paths that allow one prompt to flow into the next to reach a concluding action. Customers entering the system might be identified a priori in a database accessible to the system (e.g., based on past purchases, etc.).

In yet another aspect of some embodiments, each customer can be statistically allocated to various options and then the outcomes of those options (both short term and long term) can be measured to determine an optimum outcome. The system allows for multiple variations of each factor as well as sets of factors.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

By way of example, one set of embodiments might provide a method of optimizing outcomes of interactions with customers (which could be existing, new, or potential customers). The method might comprise providing, with a provider computer system, a customer interface for interacting with customers of a merchant. In one aspect, the merchant could be a client of a provider operating the provider computer system.

In one aspect, the method might further comprise receiving, at the customer interface, a contact from an existing customer of the merchant. The customer might be identified at the provider computer system, and/or the provider computer system might determine a status group of the customer. In some cases, the method also includes determining, with the provider computer system, a preferred outcome that is optimal for the merchant, based at least in part on one or more characteristics of the customer.

In another aspect, the method might comprise selecting, with the computer system, a prompt group for the customer, based at least in part on the status group of the customer and on a set of one or more multivariate testing rules proven to enhance a probability that the customer will accept the preferred outcome that has been determined to be optimal for the merchant. The customer interface might then present a series of prompts to the customer in accordance with the selected prompt group, each of the prompts providing an offer to the customer, the series of prompts being ordered according to a predefined path.

The method can further include receiving, with the customer interface, an acceptance of an offer corresponding to one of the prompts. In some cases, the computer system might then a fulfillment operation, based on the acceptance of the offer. In some cases, the fulfillment operation might comprise communication of the acceptance of the offer to a merchant computer system operated by the merchant.

In an aspect of yet another embodiment, the method includes evaluating the prompt group with the provider computer system, based at least in part on the acceptance of the offer. Evaluating the prompt group can comprise determining an effectiveness of the series of prompts in producing the outcome that has been determined to be optimal for the merchant. The computer system, in an embodiment, might then determine whether the prompt group is an optimal prompt group to maximize the probability that the customer will accept the outcome that has been determined to be optimal of the merchant, based at least in part on an evaluation of the prompt group. If an evaluation of the prompt group indicates that the series of prompts does not maximize the probability that the customer will accept the preferred outcome that has been determined to be optimal for the merchant, the method might include modifying the prompt group with the provider computer system.

A method of optimizing outcomes of interactions with customers, in accordance with another set of embodiments, might comprise providing, with a computer system, a customer interface for interacting with customers of a merchant, and/or receiving, at the customer interface, a contact from a customer of the merchant. The method might further comprise identifying the customer at the computer system, and/or determining, with the computer system, a status group of the customer.

In some embodiments, the method comprises selecting, with the computer system, a prompt group for the customer, based at least in part on the status group of the customer; and/or presenting, with the customer interface, a series of prompts to the customer in accordance with the selected prompt group, each of the prompts providing an offer to the customer, the series of prompts being ordered according to a predefined path. The method can also include receiving, with the customer interface, an acceptance of an offer corresponding to one of the prompts, and/or performing, at the computer system, a fulfillment operation, based on the acceptance of the offer.

The method might further include evaluating the prompt group, with the computer system, based at least in part on the acceptance of the offer, to determine an effectiveness of the series of prompts in producing a preferred outcome that has been determined to be optimal for the merchant. In some cases, the computer system might modify the prompt group, based at least in part on an evaluation of the prompt group.

Another set of embodiments provides apparatus. An exemplary apparatus might comprise a non-transitory computer readable medium having encoded thereon a set of instructions executable by one or more computers to perform one or more operations. The set of instructions might comprise instructions for performing one or more operations in accordance with methods provided by certain embodiments. Merely by way of example, the set of instructions might include instructions for providing a customer interface for interacting with customers of a merchant; instructions for receiving, at the customer interface, a contact from a customer of the merchant; instructions for identifying the customer; and/or instructions for determining a status group of the customer.

The set of instructions might further include instructions for selecting a prompt group for the customer, based at least in part on the status group of the customer; instructions for presenting, with the customer interface, a series of prompts to the customer in accordance with the selected prompt group, each of the prompts providing an offer to the customer, the series of prompts being ordered according to a predefined path; instructions for receiving, with the customer interface, an acceptance of an offer corresponding to one of the prompts; and/or instructions for performing a fulfillment operation, based on the acceptance of the offer;

In some cases, the set of instructions further comprises instructions for evaluating the prompt group, based at least in part on the acceptance of the offer, to determine an effectiveness of the series of prompts in producing a preferred outcome that has been determined to be optimal for the merchant. There might also be instructions for modifying the prompt group, based at least in part on an evaluation of the prompt group.

A computer system, in accordance with yet another set of embodiments, might comprise one or more processors and a customer interface, in communication with the one or more processors, for interfacing with existing customers of a merchant. The computer system might further include a computer readable medium in communication with the one or more processors. The computer readable medium might have encoded thereon a set of instructions executable by the computer system to perform one or more operations. Merely by way of example, the set of instructions might include instructions operable to perform operations in accordance with the methods described herein, and/or instructions similar to those described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
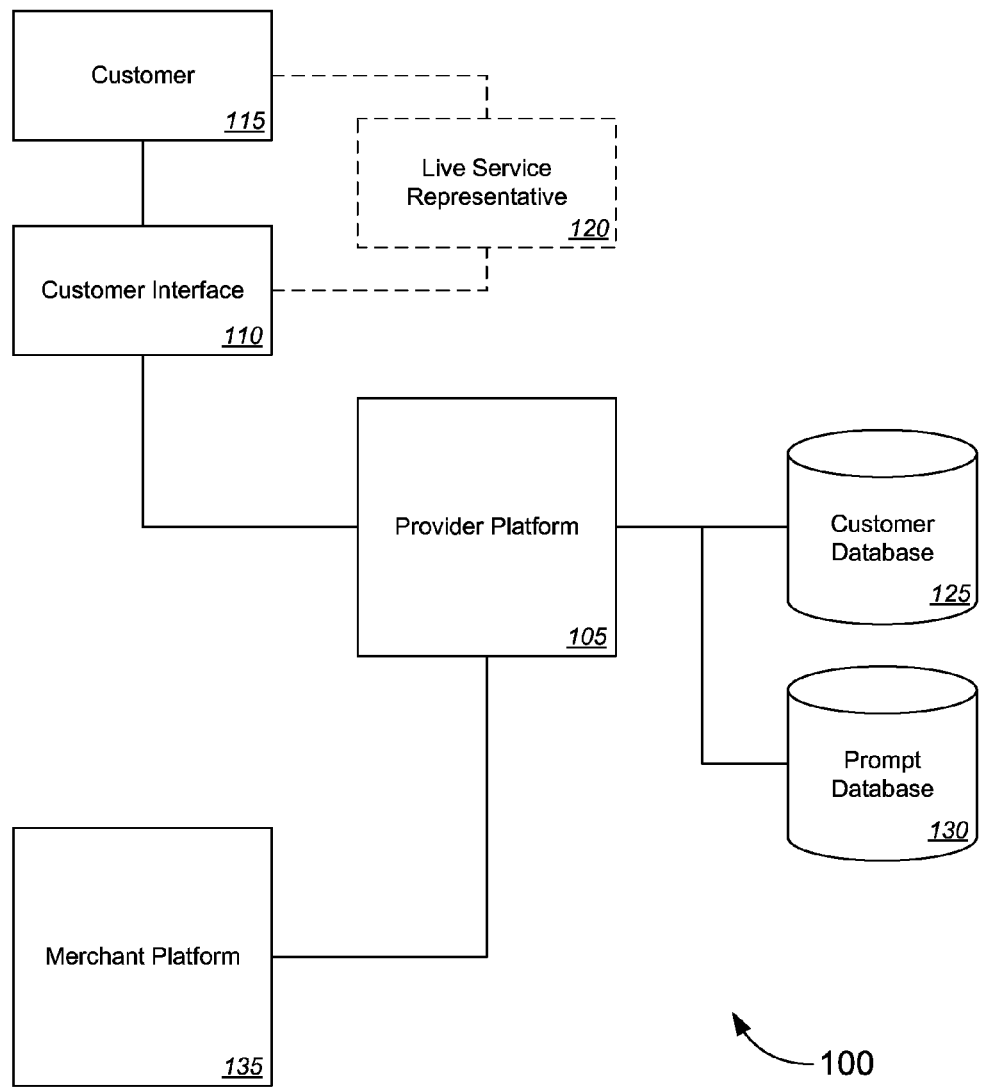
FIG. 1 is a block diagram illustrating a system for optimizing customer interactions, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments provides tools and techniques to optimize, from the merchant's perspective, the outcomes of interactions between the merchant and its customers (whether existing, new, or potential customers). As used herein, the term "outcome" means the result of an interaction between the customer and the merchant (or, more specifically, in many cases, a computer system representing the merchant). The nature of the outcome will depend largely on the nature of the interaction, but examples of outcomes might be a customer deciding to buy (or not to buy) a product, a customer deciding to return (or not to return) a previously-purchased product, as well as the circumstances under which the customer makes that decision (including, without limitation, the incentives offered to the customer to induce a decision, e.g., to buy, or not to return, a product). The customer interaction can be initiated by the customer (for example, by visiting a merchant's web site, calling a merchant's call center, etc.) or might (especially in the case of potential customers or new sales to existing customers) be initiated by a merchant (and/or a merchant's provider), e.g., via marketing email, automated or personal calls to new leads, etc.

In an aspect, certain embodiments allow for multiple variations of options (multivariate or A/B testing) and outcomes which can be statistically applied and then measured and analyzed for best economic impact or preferred outcome. In various embodiments, optimization of customer interaction outcomes includes, without limitation, decreasing customer returns and refund rates, increasing revenue per customer on an average basis, decreasing customer complaints and credit card charge backs, and/or other actions desired by a user or merchant. Such tools and techniques can be employed across a wide variety of communication channels, including without limitation, IVR, web, live customer service representative ("CSR"), email, chat, and/or the like.

In another aspect of certain embodiments, customer interactions might be defined as a series of modular prompts, which could be presented, e.g., by an IVR system, a web application, a human CSR (perhaps reading from a computer-generated script), a series of email or chat messages, and/or the like. Each prompt might include a message presented to a customer, a series of options a customer can select, a number of predefined outcomes, and a series of links to additional modules based on the selected options and/or customer-specific information (e.g., demographic information, purchase history, etc.). In some embodiments, prompts can be arranged into predefined paths that allow one prompt to flow into the next to reach a concluding action. Customers entering the system might be identified a priori in a database accessible to the system (e.g., based on past purchases, etc.). In some cases, the system can also include a status marker, which can summarizes significant information about the customer that is known to the database and which will affect which prompts are appropriate for that particular customer. Such a status marker, when employed, can be stored (e.g., as a database field), and/or determined ad hoc during the customer interaction.

In one embodiment, customers initiate contact and enter the system (e.g., though an IVR interface, a web interface, an email or chat interface, or even through interaction with a live CSR). At the same time, identifying information about the customer might be transmitted to the system by the communications channels and the status marker can be presented with that information and/or referenced by the multivariate testing system against the database. In some cases, based on the status marker, the system presents the initial prompt. The customer interacts with the prompt, for example by listening or reading, and then selecting an option (using an input method appropriate to the communication mode, such as pressing a key on a telephone keypad, selecting a button on a web page, speaking a selection to an IVR interpreter or live CSR, replying to an email or chat message, etc.), or ending the communication. The customer proceeds down his or her chosen path and each interaction, prompt and choice, can be logged.

Customers with similar details in the customer database can be assigned similar or different status markers. This functionality can allow the system to include slight variations for similar customers only in specified prompts, to provide for split testing. The system logging then allows a determination to be made whether one variation of the same prompt in a particular path is more likely to provoke the customer to select a preferred option. Once a prompt is shown to be materially more likely to result in a preferred option, that prompt can be made a default and all or a greater percentage of customers can be routed to it. Such testing can be performed iteratively and/or continuously, resulting in further optimization of the prompts. New prompts can be introduced as desired, and the efficacy of those prompts at producing the desired outcome can be measured against the efficacy of existing prompts. In yet another aspect of some embodiments, each customer can be statistically allocated to various options and then the outcomes of those options (both short term and long term) can be measured to determine an optimum outcome. The system allows for multiple variations of each factor as well as sets of factors.

FIG. 1 illustrates a system 100 that can be used to optimize the outcome of customer interactions. In the illustrated embodiment, the system 100 includes a provider platform 105 (also referred to herein as a provider computer system) that is programmed (e.g., with hardware, firmware, or software) to operate in accordance with the methods described below. In particular, the provider platform 100 is configured to support interactions with a customer of a merchant. Thus, the provider platform 105 includes a customer interface 110 to provide interaction between a customer 115 and the provider platform 105. In many cases, the customer interface 110 will include a combination of hardware and software to allow this interaction.

A variety of different types of customer interfaces can be implemented, as described more fully below. In a novel aspect of some embodiments, the methods provided by various embodiments (and, in particular, the prompts provided to the customer in accordance with such methods, and the analysis of the customer's reaction to such prompts) can be implemented using multiple types of customer interfaces within the same system. In this way, for example, the system 100 can allow customers to interact with the provider platform 105 in a variety of ways, enhancing customer satisfaction, while still accomplishing the outcome optimization functions provided by various embodiments.

Merely by way of example, one example of a customer interface 110 might include an IVR unit that is operable to receive a telephone call from the customer 115, to provide verbal prompts to the customer 115, and to receive input from the customer 115 (e.g., in the form of spoken responses from the customer 115, keypad (DTMF) input from the customer 115, and/or the like). A variety of IVR interfaces are commercially available, and any such interface with appropriate functionality can be employed in accordance with various embodiments.

Alternatively and/or additionally, the customer interface 110 might include hardware and/or software to enable communications with the customer 115 via email, chat, short message service ("SMS") and/or the like. Such facilities can include merely by way of example, a mail server, chat server, SMS gateway, and/or the like. In this case, a prompt may be presented to the customer 115 as an email message, chat message, etc., and input can be received from the customer as a reply email message (perhaps containing specific text in the subject and/or body of the message), reply chat message, reply SMS, and/or the like.

In further embodiments, the customer interface 110 alternatively and/or additionally might include a live CSR 120. In such embodiments, the provider platform 105 might provide the customer interface by providing, for the CSR 120, a script that includes the selected prompts. Merely by way of example, the provider platform 105 might display a first prompt for the CSR 120, and after displaying the first prompt, provide an input mechanism (such as a text input box, button or other user-interface widget, etc.) for the CSR 120 to provide input indicating the response of the customer 115 to the prompt read by the CSR 120. Based on the input from the CSR 120, the provider platform 105 then could display a second prompt, as selected by the provider platform 105 in accordance with the methods discussed below.

In yet further embodiments, the customer interface 110 might be implemented by a web interface (or other computer user interface), either for direct interaction with the customer 115 or for interaction with a CSR 120 (who can intermediate, as described above, between the web interface and customer 115.)

Thus, in an aspect, the provider platform 105 comprises a user interface (which can serve, on its own, or in conjunction with a CSR 120, as the customer interface 110). Most generally the user interface allows users (e.g., customers, CSRs, administrators, etc.) to interact with the provider platform 105. A variety of user interfaces may be provided in accordance with various embodiments, including without limitation graphical user interfaces that display, for a user, display screens for providing information to the user and/or receiving user input from a user.

Merely by way of example, in some embodiments (such as, for example, when a live CSR 120 participates in the customer interaction), the provider platform 105 may be configured to communicate with a client computer via a dedicated application running on the client computer; in this situation, the user interface might be displayed by the client computer, based on data and/or instructions provided by the provider platform 105. In this situation, providing the user interface might comprise providing instructions and/or data to cause the client computer to display the user interface. In other embodiments (such as when the customer interface 110 comprises a web interface, for example), the user interface may be provided from a web site, e.g., by providing a set of one or more web pages, which might be displayed in a web browser running on a user computer and/or might be served by a web server (not shown on FIG. 1). In various embodiments, the provider platform 105 might comprise the web server and/or be in communication with the web server, such that the provider platform 105 provides data to the web server to be incorporated in web pages served by the web server for reception and/or display by a browser at the user computer.

In a set of embodiments, the provider platform 105 comprises, or is in communication with, one or more databases. As illustrated by FIG. 1, these databases include a customer database 125, which stores information about customers, and a prompt database 130, which stores information about prompts to be provided to customers. In some aspects, the prompt database also stores the business rules (and/or other logic) that determines prompt groups, as described in further detail below, as well as, in some cases, results of analysis and/or evaluation of the performance of various prompts and prompt groups. It should be appreciated, however, that the depiction of FIG. 1 is meant to be illustrative in nature, and that the data processed and/or generated by the provider platform 105 can be stored in any suitable arrangement. Merely by way of example, in some cases, the customer database 125 and the prompt database 130 might be combined in a single database. In other cases, the prompt database 130, for example, might be divided into multiple databases (e.g., one database that stores the prompts themselves, and another database that stores the results of analysis of the efficacy of various prompts at producing the desired outcomes from customer interactions).

In some cases, the provider platform 105 is operated by a third-party CRM provider to facilitate customer interactions between the merchant and the customer 115. Thus, in such cases, the provider platform 105 might be in communication with a merchant platform 135 (also referred to herein as a merchant computer system), which provides common information technology functions for the merchant. Such functions can include, without limitation, merchant services (e.g., payment processing), customer tracking and invoicing, order fulfillment, supply chain management, and/or the like. In such embodiments, the provider platform 105 might communicate with the merchant platform 135 to obtain customer information, sales history information, and/or the like. Such communication can occur during the customer interaction; alternatively and/or additionally, the provider platform 105 might obtain some or all such information (e.g., on a batch basis) from the merchant platform 135 before any customer interaction. As noted in further detail below, in some embodiments, depending on the outcome of the customer interaction, the provider platform 105 might communicate with the merchant platform 135 as part of a fulfillment operation to fulfill any orders placed by the customer during the customer interaction, to notify the merchant platform of any returns that need to be processed, etc.

It should be recognized, of course, that a merchant might operate the system 100 on its own, without the use of a third-party CRM provider. In such cases, the merchant platform 135 might provide the functionality of the provider platform 105 (in which case, the provider platform 105 could be integrated within the merchant platform 135 and were eliminated), and/or the merchant might operate the provider platform 105 itself. A variety of relationships between the merchant and the provider can be supported, the architecture of the system 100, therefore, should be considered exemplary in nature and modifiable within the scope of various embodiments to comport with specific implementations.

Figure 2:
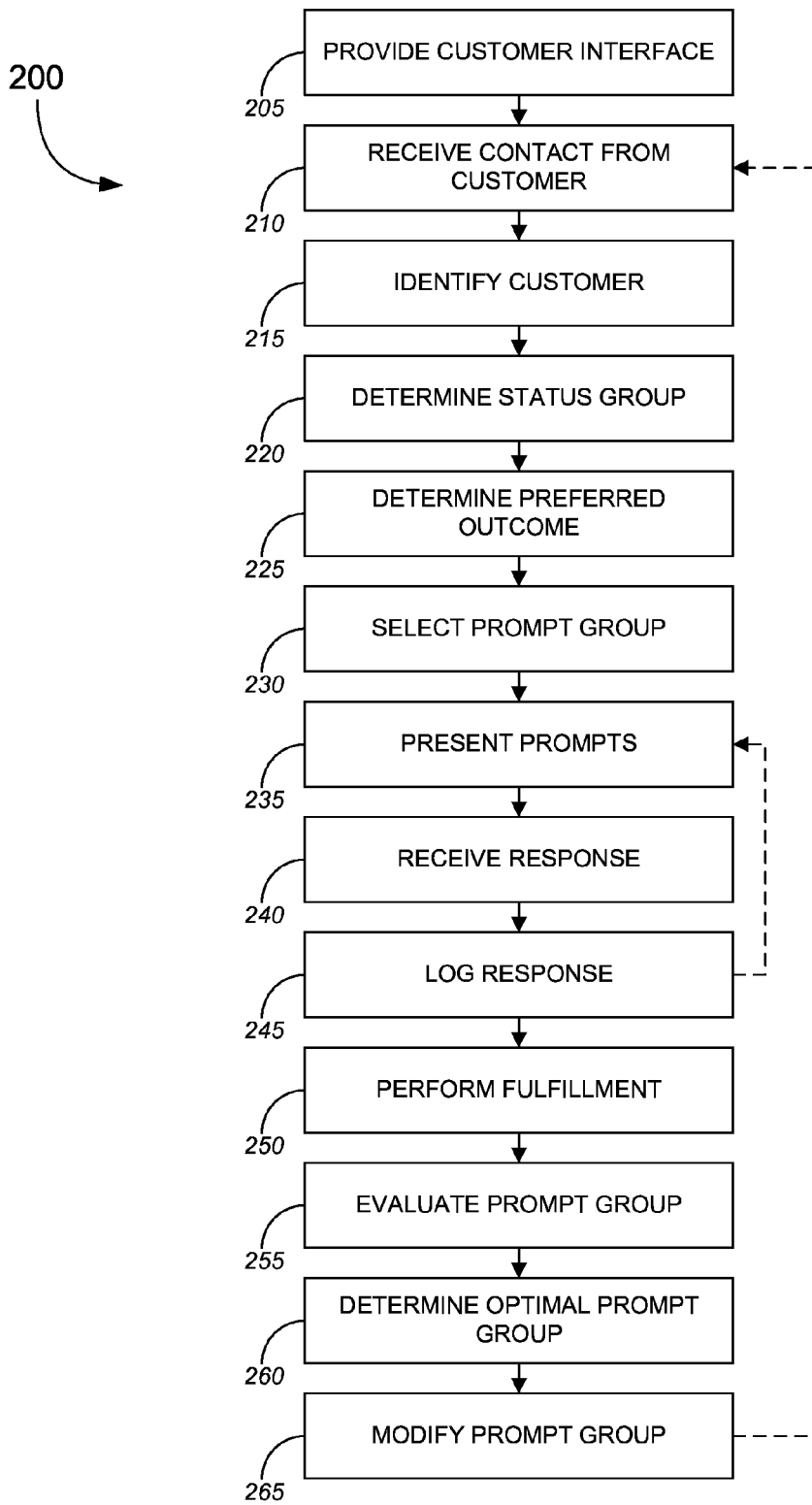
FIG. 2 is a process flow diagram illustrating a method of optimizing customer interactions, in accordance with various embodiments.
Figure 3:
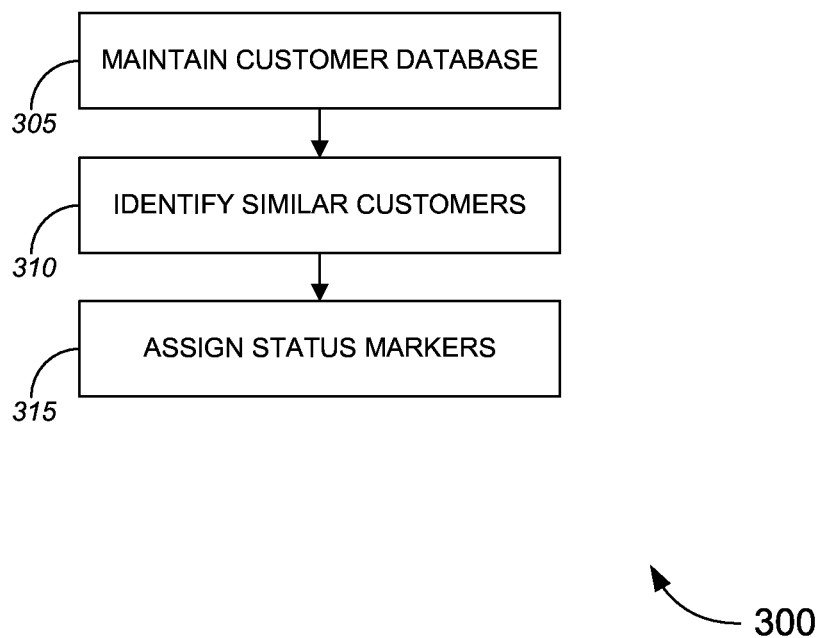
FIG. 3 is a process flow diagram illustrating a method of identifying and characterizing customers, in accordance with various embodiments.
Figure 5:
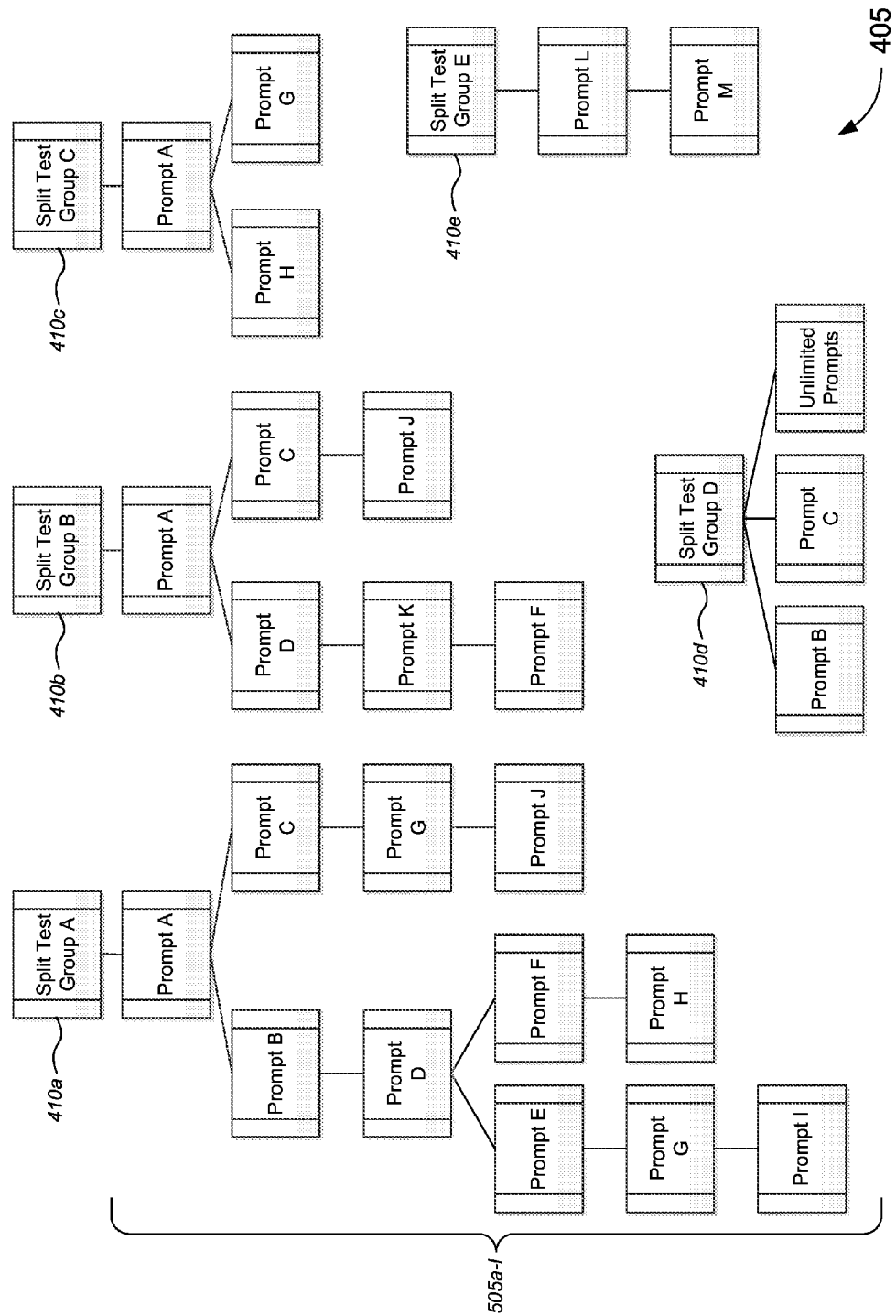
FIG. 5 illustrates a set of split test groups, in accordance with various embodiments.

FIGS. 2, 3, and 5 illustrate various methods that can be used to optimize customer interactions. While the methods of FIGS. 2, 3, and 5 are illustrated, for ease of description, as different methods, it should be appreciated that the various techniques and procedures of these methods can be combined in any suitable fashion, and that, in some embodiments, the methods depicted by FIGS. 2, 3, and 5 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2, 3, and 5 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 2, 3, and 5 (e.g., by executing instructions embodied on a computer readable medium), the system 100 can also operate according to other modes of operation and/or perform other suitable procedures.

FIG. 2 illustrates a method 200 of optimizing a customer interaction, in accordance with a set of embodiments. In the illustrated embodiment, the method 200 comprises providing, with a computer system (e.g., a provider platform), a customer interface for interacting with customers of a merchant (block 205). As noted above, in some cases, the merchant might be a client of a provider that operates the computer system. As further noted above, a variety of customer interfaces can be supported (in some cases simultaneously) by certain embodiments. Thus, the operation of providing a customer interface can take a number of different forms, depending on the type of customer interface(s) provided. Merely by way of example, in some cases, providing a customer interface might comprise the computer system interacting with a customer via an IVR interface, an email/chat/SMS interface, a web interface, or even though a live CSR via a user interface that interacts with the CSR. In a general sense, the operation of providing a customer interface can comprise any operations that enable or facilitate interactions (e.g., the interactions described in further detail below) between a customer and the computer system.

Thus, in a specific embodiment, the act of providing a customer interface can involve, more generally, providing a user interface, either for direct interaction with a customer, or for interaction with a live (human) CSR, who, in turn, interacts with the customer. For example, the user interface can be used to output information for a user, e.g., by displaying the information on a display device, printing information with a printer, playing audio through a speaker, generating speech with an IVR, transmitting an email/chat/SMS message, etc.; the user interface can also function to receive input from a user, e.g., using standard input devices such as mice and other pointing devices, motion capture devices, touchpads and/or touchscreens, keyboards (e.g., numeric and/or alphabetic), microphones, by receiving and recognizing DTMF tones and/or speech with an IVR, etc.

The procedures undertaken to provide a visual user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a visual user interface will comprise providing one or more display screens each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user (e.g., a customer or CSR) and a computer system. Hence, when this document describes procedures for displaying (or otherwise providing) information to a user, or to receiving input from a user, the user interface may be the vehicle for the exchange of such input/output, either audibly, visually, or both.

In a set of embodiments, the method 200 further comprises, receiving (e.g., at the customer interface), a contact from a customer of the merchant (block 210). Such a contact might be initiated by the customer (e.g., by calling a customer service telephone number, visiting a web site, etc.) or by the computer system itself (or a CSR in communication with the computer system).

At block 215, the method 200 comprises identifying the customer at the computer system, and at block 220, the method 220 comprises determining a status group of the customer. A variety of techniques can be used to identify the customer and/or determine the status group of the customer. One such technique employs a methodology by which customers are tracked and characterized by the computer system. This methodology is illustrated by FIG. 3.

Turning to FIG. 3, one method 300 of tracking and/or characterizing the customer comprises maintaining a customer database (block 305). In various aspects, maintaining the customer database can comprise any of a variety of operations related to populating the database with data, updating the data in the database, making the database available for use (e.g., for use by the provider platform and/or other systems), and/or the like.

In accordance with some embodiments, the customer database will include a table of customers, with each record in the table corresponding to a particular customer (who might be a new customer, an existing customer, or a potential customer). A record in the customer database (e.g., a customer record, customer order record, and/or records in other tables, to which the customer record and/or order record is related) can include a variety of data about the customer to whom the record corresponds. Examples include, without limitation, biographical and/or demographic information, such as a customer's name, address, personal preferences, interests, and/or the like. Such information may be obtained from, e.g., the customer itself, the merchant's system, external and/or public data sources, and/or the like. Additionally, a customer's record in the database can include that customer's purchase history (with the merchant enter with others), other information about the relationship between the customer and merchant (such as, for example, the customer's history of returning purchased items), and/or the like. Again, such information can be obtained from a variety of sources, including without limitation the merchant's platform.

Alternatively and/or additionally, the customer database might store a customer orders table, in which each customer's order(s) are stored as records. The order records, for example, might be relationally linked to a record in a customer table, to correlate orders with other customer information. (Alternatively and/or additionally, this customer information could be stored in the customer orders table, and/or the customer table could be eliminated). Thus, in some cases, the system has the ability to store information about a transaction history with a particular customer, and that transaction history might inform the determination of a customer's status and/or the selection of a prompt group for that customer, as noted below. Merely by way of example, a customer who has had multiple credit card charges, and no refunds, might have a different status (and therefore could be treated differently) than a customer who has had some credit card chargebacks. In any event, it should be appreciated that the manner in which customer data is stored is discretionary and can vary by implementation.

The method 300 can further comprise identifying similar customers in the customer database. A variety of business rules can be employed to determine whether two customers are considered to be "similar." In many cases, such a determination will depend on the merchant's preferences. As a general example, however, two customers might be considered similar if they share common demographic traits, purchase histories, and/or the like. It should be noted that the identification of similar customers can be performed a priori, and this determination stored in the customer database or elsewhere; additionally and/or alternatively, a determination that one customer is similar to one or more other customers can be made dynamically during the course of a customer interaction with the computer system.

At block 315, the method 300 comprises assigning a status marker to the customer. As with the identification of similar customers, the assignment of a status marker to a particular customer can be performed a priori (optionally, with a status marker being stored in the customer record and/or elsewhere) and/or dynamically during the course of the customer interaction. In one aspect, a status marker indicates the status of a customer, such that customers being identified as similar might be given the same (or a similar) status marker. In other cases, two similar customers might be given different status markers, e.g., to ensure that they as assigned different prompt groups. (It should be noted, however, that, in some embodiments, two customers with the same status marker might be given two different split test groups from within one prompt group, as described below). Thus, the status markers can be used in different ways according to different embodiments.

In addition to information obtained from the customer record, the computer system might use information from the customer interaction in assigning a status marker to the customer. Merely by way of example, if a customer initiates contact with the computer system in order to return a product with which the customer is dissatisfied, the customer might be assigned one status marker, while if the same customer had initiated contact with the computer system in order to purchase additional products, that customer might have been given a different status marker. As described in further detail below, the status of a customer can be used to determine the prompts that should be presented the customer; in many cases, therefore, the status of the customer (and, accordingly, the status markers assigned to the customer) often will depend on the motivation behind the customer's contact with the computer system (which can be determined, for example, by the customer's response to an initial prompt, which may be presented to the customer outside of the context of the selected prompt group), and/or by whether the customer or the merchant/provider initiated the interaction.

Returning to FIG. 2, and more specifically, blocks 215 and 220, a customer can be identified, in one embodiment, by obtaining an identifier associated with the customer. Such an identifier can be, for example, the telephone number from which the customer is calling, and the identifier can be obtained, in some cases, by receiving automatic number identification ("ANI") information, e.g., from the public switched telephone network ("PSTN") when the customer's call is connected with an IVR system in communication with the computer system. As another example, if the customer interface is email, an email address could be used as the identifier, or of the customer interface is SMS, the telephone number associated with the SMS communication could be used as an identifier. For web-based interactions, the customer might be authenticated (e.g., with userid and password), and that authentication information could be used as an identifier. In an aspect, the identifier is unique, at least within the computer system, and perhaps globally unique (as in the case of a telephone number or email address). In some cases, the system might identify a customer using two or more data elements, which together identify the customer uniquely within the system. Merely by way of example, the combination of a customer's first name, last name and zip code can serve as a unique identifier in certain embodiments.

Once this identifier has been obtained, the computer system can use the identifier as search criteria to identify a record in the customer database associated with the identifier (and therefore with the customer). Other information in the database can be used to determine the status group of the customer. Merely by way of example, as noted above, the customer might be assigned a status marker (based on one or more of a variety of factors), and this status marker can be used to determine the status group of the customer. In an aspect, a given status group of customers will all have a similar status (based on whatever criteria are used to determine customer status in a particular implementation). As described in further detail below, customers within the same status group can be presented with different split test groups of prompts in order to perform split testing (A/B or multivariate testing) of various combinations and orderings of prompts.

At block 225, the system determines a preferred outcome of the interaction with the customer that will produce an optimal result for the merchant, given the current circumstances of the customer. In an aspect, this determination is based, in part on characteristics of the customer (which can include the status group of the customer). For example, characteristics such as the type (e.g., status group) of the customer, source of the customer (e.g., how the customer became a customer of the merchant), age of an account of the customer (i.e., how long the customer has been a customer of the merchant), the status of an account of the customer (e.g., a payment history of the customer, the customer's status as a preferred customer, etc.), the purchase history of the customer, and/or demographic information about the customer The determination of the preferred outcome might also depend, in part, on the merchant's preferences, which can, in some cases, be embodied as business rules that are specific to the merchant. Merely by way of example, the business model of a particular merchant might dictate that customer returns are prohibitively expensive, such that a preferred outcome for that merchant might include any outcome in which the customer keeps the purchased product, and the amount of any refund provided to the customer is minimized. Another merchant, however, might prioritize maximizing satisfaction of existing customers and selling new products to those customers, such that an optimal outcome would be any outcome in which the customer indicated satisfaction with the outcome and purchases additional products during the customer interaction.

Faced with a customer seeking to return a purchased product, these two merchants might have very different optimal outcomes. The first merchant, for example, might be an optimal outcome in the situation as an outcome in which the customer keeps the product, and the merchant provides the customer with a refund of 25% of the purchase price. On the other hand, the second merchant might consider an optimal outcome to be an outcome in which the customer purchases one or more additional products, regardless of whether the customer interaction results in the return of the previously purchased product.

Thus, by applying merchant-specific business rules to a customer in this situation, the system might determine a different optimal outcome for each merchant. These business rules often implement pre-determined preferences of each merchant. In a simple case, a preferred outcome might merely be for the customer to accept a particular offer. In another case, a preferred outcome might be to constrain the length, frequency, and/or communication channel of customer interactions. Thus for example, a merchant might desire a series of prompts designed to most quickly result in customer acceptance of an offer, or a merchant might desire a series of prompts that encourage the customer to end the telephone interaction and resume the interaction via a website.

Moreover, the same merchant might have different optimal outcomes for customers in different status groups. For example, an optimal outcome for a long-time customer might include ensuring customer satisfaction with the outcome, while an optimal outcome for customer seeking to return the first product purchased from that merchant might merely comprise minimizing the financial loss for the merchant, irrespective of ultimate customer satisfaction.

At block 230, the computer system selects a prompt group for the customer. This selection can be based, in part on the status group of the customer, as well as one or more multivariate testing rules. In an aspect, these multivariate testing rules are based on statistical analysis (as described in further detail below) that has determined that the selected prompt group will enhance the probability that the customer will accept the merchant's preferred outcome. In a particular aspect, the customer's status group is used to select the prompt group for the customer, and business rules are used to select a split test group (within the prompt group) that will be employed for that particular customer interaction. In this way, customers with similar status can be given different split test groups within the same prompt group, to allow for split testing of various groups of prompts.

As used herein, the term "prompt group" can include both an overall prompt group (based on the customer's status) and a split test group within that prompt group. Thus, depending on the embodiment, selection of a prompt group can include selection of an overall prompt group, as well as, in some cases, selection of a split test group to be used specifically for that customer interaction.

Figure 4:
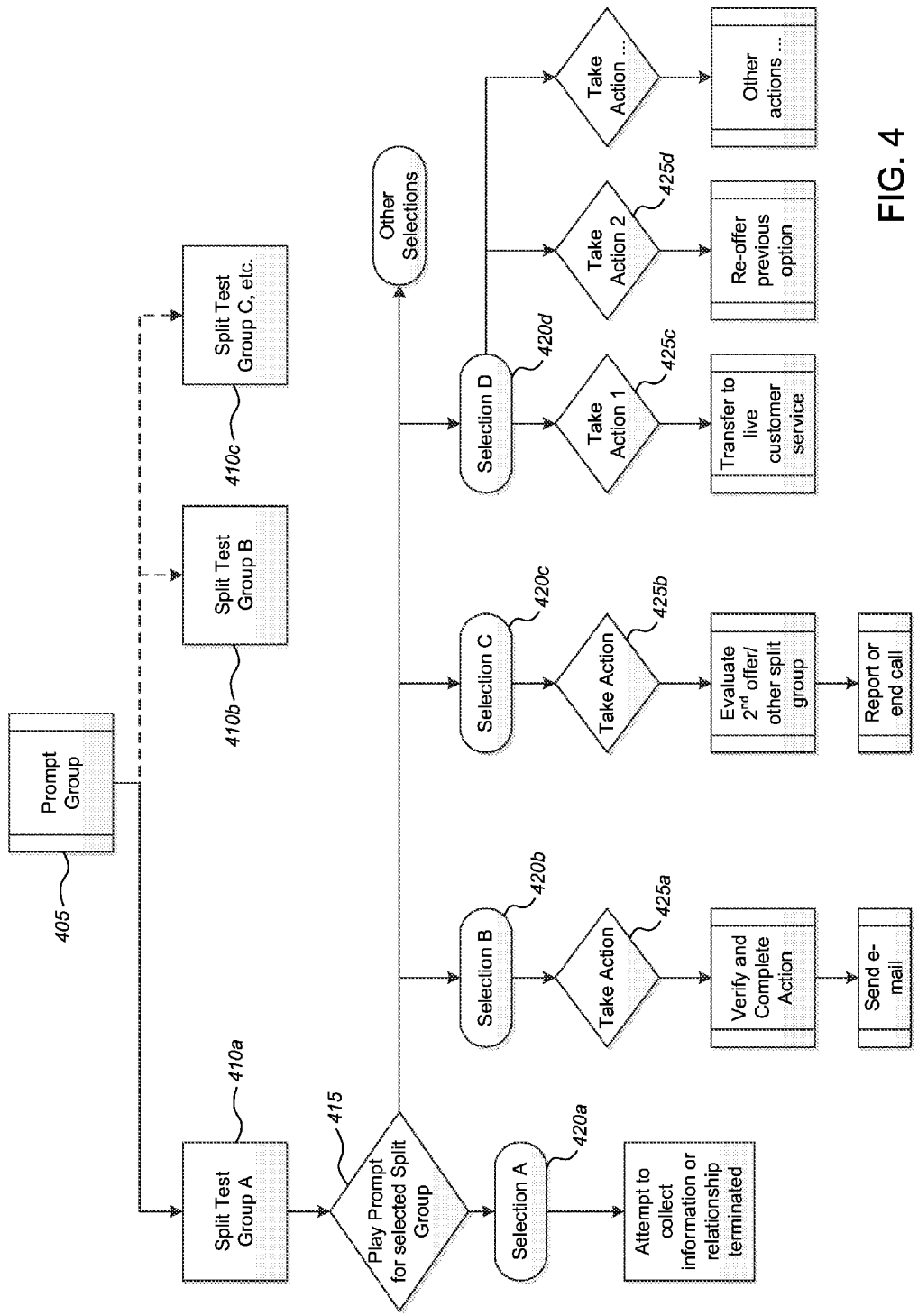
FIG. 4 illustrates a prompt group, in accordance with various embodiments.

FIG. 4 illustrates a prompt group 405 in accordance with one set of embodiments. A prompt group 405 can include a plurality of split test groups 410. As illustrated, the prompt group 405 includes Split Test Group A 410a, Split Test Group B 410b, and Split Test Group C 410c. It should be appreciated, however, that a prompt group 405 can include any number of split test groups 410, and in some cases a prompt group 405 will include only one group of prompts.

FIG. 5 illustrates the prompt group 405 in further detail, showing the arrangement of various prompts 505 within a plurality of split test groups 410. (In describing FIG. 5, this document will refer to prompts generally using the reference numeral 505, and will refer to specific prompts illustrated on FIG. 5 with the numeral 505 followed by a sub-label corresponding to the illustrated prompt identifier. Thus, Prompt A, as illustrated, will be referenced with numeral 505a, Prompt B will be referenced with numeral 505b, and so forth.)

As can be seen from a review of FIG. 5, in the illustrated embodiment, a split test group comprises a series of prompts ordered hierarchically, such that the prompts are presented to the customer in series, with branching to indicate points at which the customer is presented with multiple options. Depending on which option is selected by the customer, the hierarchy determines which of two (or more) prompts at the same level in the hierarchy is presented next to the user.

To illustrate, Split Test Group A 410a first presents Prompt A 505a to the customer. Prompt A 505a, for example, might prompt the customer to indicate whether the customer has contacted the provider to return a product or to purchase a new product. If the customer response to the prompt indicates that the customer would like to return a product the hierarchy dictates that Prompt B 505b is presented to the customer. On the other hand, if the customer response indicates that the customer would like to purchase a new product, the hierarchy dictates that Prompt C 505c is presented to the customer.

Continuing with this example, Prompt B 505b might offer the customer an additional trial period to continue using the product without charge. If the customer accepts this offer, the customer exits the series of prompts (and the customer's acceptance of this offer is recorded for further action, as described further below). If the customer does not accept this offer, the customer is then presented with Prompt D 505d, which might offer the customer a choice between returning the product for a full refund and keeping the product in return for a partial refund.

If the customer's accepts the offer of keeping the product for partial refund, the customer might be presented with Prompt E 505e, which offers to sell the customer another product at a discount. If the customer declines that offer, the customer exits the series of prompts. If the customer's response indicates that he or she would like to purchase another product at a discount, the system presents Prompt G 505g, which includes an offer for another product at a discount. If the customer accepts that offer, the customer exits the series of prompts. If the customer declines that offer, the customer is presented with Prompt I 505iIs, which offers the same product at a deeper discount. At that point, whether the customer accepts or declines the offer, the customer exits the series of prompts.

On the other hand, if the customer indicates that he or she does not wish to keep the product for a partial refund, the customer might be presented with Prompt F 505f, which includes an offer to allow the customer to keep the product in return for a partial refund and a gift card to a department store chain. If the customer accepts this offer, the customer exits the series of prompts. If, however, the customer declines this offer, the customer is presented with Prompt H 505h, which might include an offer to allow the customer to keep the product in return for a full refund (for example, in order to save the merchant shipping cost of returning the product). Whether the customer accepts this offer or declines the offer, the customer exits the series of prompts.

Returning to the top of the hierarchy in Split Test Group A 410a, if the customer indicates, in response to Prompt A 505a, that he or she would like to purchase another product, the customer is presented with Prompt G 505g, which, in this example, offers another product to the customer at a discount. If the customer accepts this offer, the customer exits the series of prompts. If the customer does not accept the offer, the system presents the customer with Prompt J 505j, which might offer the product to the customer with the same discount, along with a gift card to a popular restaurant. Whether the customer accepts or declines this offer, the customer exits the series of prompts.

In this example, Split Test Group B 410b might include the same initial Prompt A 505a. In this case, however, if the customer indicates that he or she would like to return a product, the customer is presented immediately with Prompt D 505d, which, as noted above, offers the customer a choice between returning the product for a full refund and keeping the product in return for a partial refund. If the customer accepts the offer to keep the product in return for a partial refund, the customer exits the series of prompts. If the customer indicates that he or she would like to return the product for a full refund, the customer is presented with Prompt K 505k, which in this example, might be similar to Prompt E 505e, but with different verbiage. If the customer declines that offer, the customer is then presented with Prompt F 505f, which, as described above, includes an offer to allow the customer to keep the product in return for a partial refund and a gift card to a department store chain.

If the customer indicates, in response to Prompt A 505a, that he or she would like to purchase a new product, Split Test Group B 410b presents the customer with Prompt C 505c, as does Split Test Group A 410a. If the customer declines the offer provided by Prompt C 505c, the customer is immediately presented with Prompt J 505j.

Split Test Group C 410c presents some of the same prompts, but in a different order. As illustrated by Split Test Group D 401d, any number of options can be offered to the customer at a given level of the hierarchy. Split Test Group E 410e includes Prompt L 505L, which might correspond to Prompt C, but in a different voice, and prompt M 505m, which might correspond to Prompt G 505g, but in a different voice and with different verbiage.

While the above example is but one of many examples of how split test groups can be arranged (and neither the example itself or of the exemplary prompts described should be considered limiting), this example illustrates several beneficial features of certain embodiments. For example, two different split test groups can have the same prompts, but those prompts might be ordered differently in each of the two different groups. Likewise, two different split test groups could have the same prompts that differ only in the style in which the prompt is delivered. The style of a prompt can include a number of factors, such as the voice and/or inclination in which a prompt is presented (for example, if the customer interface is an audible interface such as an IVR interface), the verbiage used to present the offer in the prompt, and/or the like. Moreover, in some cases, prompts within different split test groups might present similar offers that differ only in the details, such as the amount of discount offered, the location at which a gift card can be redeemed, and/or the like.

Returning to FIG. 4, a prompt within a particular Split Test Group 410 can offer the customer a variety of options from which to select. Depending on the customer's selection 420, indicated by the customer's response to the presentation 415 of the prompt, the system will take one of a number of actions 425. As indicated above, one such action can be presenting the customer with another prompt. In other cases, the action can include transferring the customer to a live CSR, re-presenting a previous offer, verifying the customer's selection and performing a fulfillment operation in accordance with that selection (optionally with a confirming email), reporting a customer selection (e.g., to a merchant platform), ending customer interaction session, and/or the like.

Returning again to FIG. 2, the method 200 might further comprise presenting (e.g., with the customer interface) one or more prompts to the customer, in accordance with the selected prompt group. The one or more prompts might be part of a series of prompts. As noted above, in one aspect, each of the prompts provides one or more offers to the customer, and, in another aspect, the series of prompts is ordered according to a predefined path, which might be determined by the selected prompt group (which might be a split test group, as described above).

At block 240, the computer system receives (e.g., via the customer interface), a response to each prompt. The manner in which the response is received, of course, will often depend on the communication channel of the customer interaction. As noted above, the response can be received as user input directly from the customer, e.g., in the form of a spoken response and/or a DTMF keypress (which could be interpreted by an IVR system), input to a web application and/or submission of a web-based form, an email message, chat message, SMS message, and/or the like, spoken input to a live CSR who could then input the response into a user-interface, and/or the like. The nature of the response itself generally will depend on the nature of the prompt to which the customer is responding. For example some prompts might require only a yes or no answer, while other prompts might require the customer to select one of two or more available options. In such cases, the prompt might inform the user of the appropriate response, especially in the case of an IVR interaction (e.g., by prompting the user, "To accept this offer, press one or say yes; to decline this offer, press two or say no," or "Please press or say the number corresponding to your selection," etc.).

At indicated by the broken arrow on FIG. 2, the computer system might continue to present prompts sequentially to the customer until the computer system receives (e.g., via the customer interface), an acceptance of an offer corresponding to one of the prompts. (It should be noted, of course, that the series of prompts presented to the customer might consist of a single prompt, if the customer accepts an offer corresponding to the first prompt presented to the customer.) In some embodiments, the customer's response to each of the series of prompts is logged (block 245) for later analysis. Merely by way of example, in some cases, the system will record, in the prompt database, the customer's response to each of the prompts. In an aspect, the system logs both declined offers and accepted offers, as well as selections from among multiple options, in order to allow for later analysis of the customer's response to the prompt group and/or evaluation of the appropriate Based on the acceptance of one of the offers, the computer system performs a fulfillment operation (block 250). Any of a variety of operations can be performed as part of the fulfillment operation. Merely by way of example, in some cases, the fulfillment operation might comprise communication with a merchant platform to inform the merchant of the acceptance of the offer. In such cases, the provider platform might interface with the merchant platform (using an API, XML data stream, web services, or any other appropriate interface technique) to communicate the nature of the accepted offer to the merchant platform. Alternatively and/or additionally, in performing a fulfillment operation, the provider computer system might take actions independent of the merchant platform. Merely by way of example, if the provider computer system is configured to perform merchant services, the provider computer system might process a credit card refund for the customer. As another example, the provider computer system might schedule delivery of shipping materials to the customer for return of the product, might interface with the third-party fulfillment entity, and/or the like.

At block 255, the prompt group is evaluated. In one aspect, evaluation of the prompt group can be performed by the computer system, either in automated fashion (without user input), or based on user input. In another aspect, a human might be responsible for evaluation of the prompt group. In some cases, evaluating the prompt group comprises determining, based at least in part on the accepted offer (and/or other offers that were not accepted), the effectiveness of the series of prompts in producing the merchant's preferred outcome. In other cases, this evaluation can be a comparative evaluation, in which the customer's response to the split group presented to the customer is compared with similar customers' responses to other split groups within same prompt group. In other cases, the evaluation might be performed without comparison to any other prompt groups, for example based only an evaluation of the outcome of the interaction, in comparison with the merchant's preferred outcome.

The method 200, then, might comprise determining whether the prompt group is an optimal prompt group (block 260). In this context, an "optimal" prompt group is the prompt group that, when compared with other prompt groups that have been evaluated, will maximize the probability that a future or hypothetical customer having particular characteristics or status will accept the merchant's preferred outcome.

If, for example, the evaluation determines that the prompt group is not the optimal prompt group, the computer system might modify the prompt group (block 265) for future use, either in automated fashion (i.e., without user input) or based, at least in part, on user input. It should be noted, however, that a prompt group might be modified, even if that product group has not been shown to be suboptimal comparison with other prompt groups, in the interest of improving the performance of the prompt groups overall.

Modifying the prompt group can take many forms. Merely by way of example, in some cases modifying a prompt group can comprise replacing the prompt group with another prompt group (e.g., a prompt group that has been shown, in split testing, to be more effective in obtaining the merchants preferred outcome). Alternatively and/or additionally, modifying a product group might comprise modifying one more prompts in the group. For example, the order of the prompts in the group might be rearranged; one or more prompts may be added to or removed from the group; or the verbiage, voice, and/or intonation of one or more the prompts might be modified.

As shown by the broken line on FIG. 2, this process can be repeated iteratively for different customers, and in particular different customers with similar characteristics or status, in order to continually refine the prompts that are presented to those types of customers, based on the customers' respective responses to the prompts in the prompt group. Thus, the process illustrated by FIG. 2 can serve as a feedback loop to continually optimize the system's interaction with such customers. It should be appreciated as well, of course, that the method 200 can be implemented using a variety of different prompt groups for different sets of customers having similar characteristics and/or status. Accordingly, the operation of modifying a prompt group can comprise selecting a different prompt group as an optimal prompt group for that status group of customers.

Figure 6:
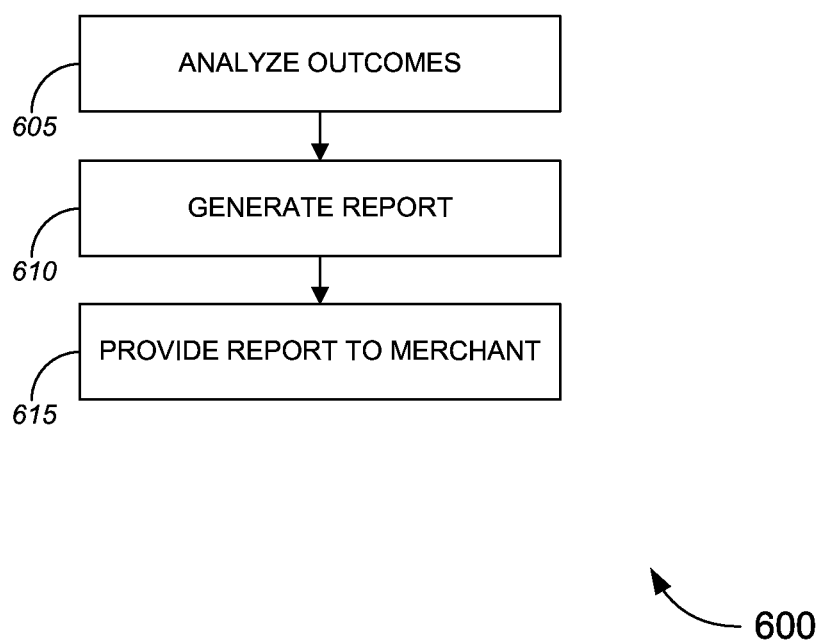
FIG. 6 is a process flow diagram illustrating a method of reporting on customer outcomes, in accordance with various embodiments.

Certain embodiments also enable the ability to provide feedback to the merchant (and/or the provider) on the efficacy of various prompt groups and customer interaction strategies. FIG. 6 illustrates a method 600 of providing such feedback.

At block 605, the computer system analyzes a plurality of outcomes, corresponding to a plurality of customer interactions with the computer system. The plurality of customer interactions collectively employ a plurality of prompt groups (although two or more of the customer interactions might employ the same prompt group). Through this analysis, the computer system can determine the relative efficacy of each of the prompt groups, perhaps including an initial prompt group requested by the merchant, at producing the merchant's preferred outcome. In some cases, if the merchant has developed a ranked list of outcomes, the analysis can determine the relative efficacy of each of the prompt groups at producing outcomes of a certain rank or higher, etc. One skilled in the art can appreciate that a variety of different types of analysis can be undertaken to evaluate the performance of different prompt groups.

At block 610, the computer system generates a report describing the relative efficacy of each of the prompt groups. In a particular aspect, for example, the report might provide a comparison of the number of optimal outcomes (either as an absolute number or as a relative number) produced by the merchant's proposed prompt group with the number of optimal outcomes (again, either as an absolute number or as a relative number) produced by other prompt groups developed by the system through the refinement process described with respect to FIG. 2.

A report can take any number of forms. Merely by way of example, a report produced in accordance with certain embodiments may include a graphical depiction (and/or textual description) of each of the prompts and/or the order of the prompts within each prompt group. Such a report might include a graphical, tabular, and/or textual depiction of the relative performance of each prompt group, such as a bar chart illustrating the percentage of optimal outcomes produced by each of the prompt groups. As one skilled in the art will ascertain based on the disclosure herein, a wide variety of reports can be produced, in accordance with various embodiments and/or the preferences of the CRM provider and/or the merchant.

At block 615, the method 600 comprises providing the report to the merchant. The report can be provided to the merchant using a variety of different techniques. Merely by way of example, the computer system might provide the report in an automated email message to the appropriate personnel at the merchant, might provide the report via a website (either through incorporation in a webpage or as a downloadable document), by displaying the report in a user interface, by printing the report for hardcopy delivery, and/or the like.

Figure 7:
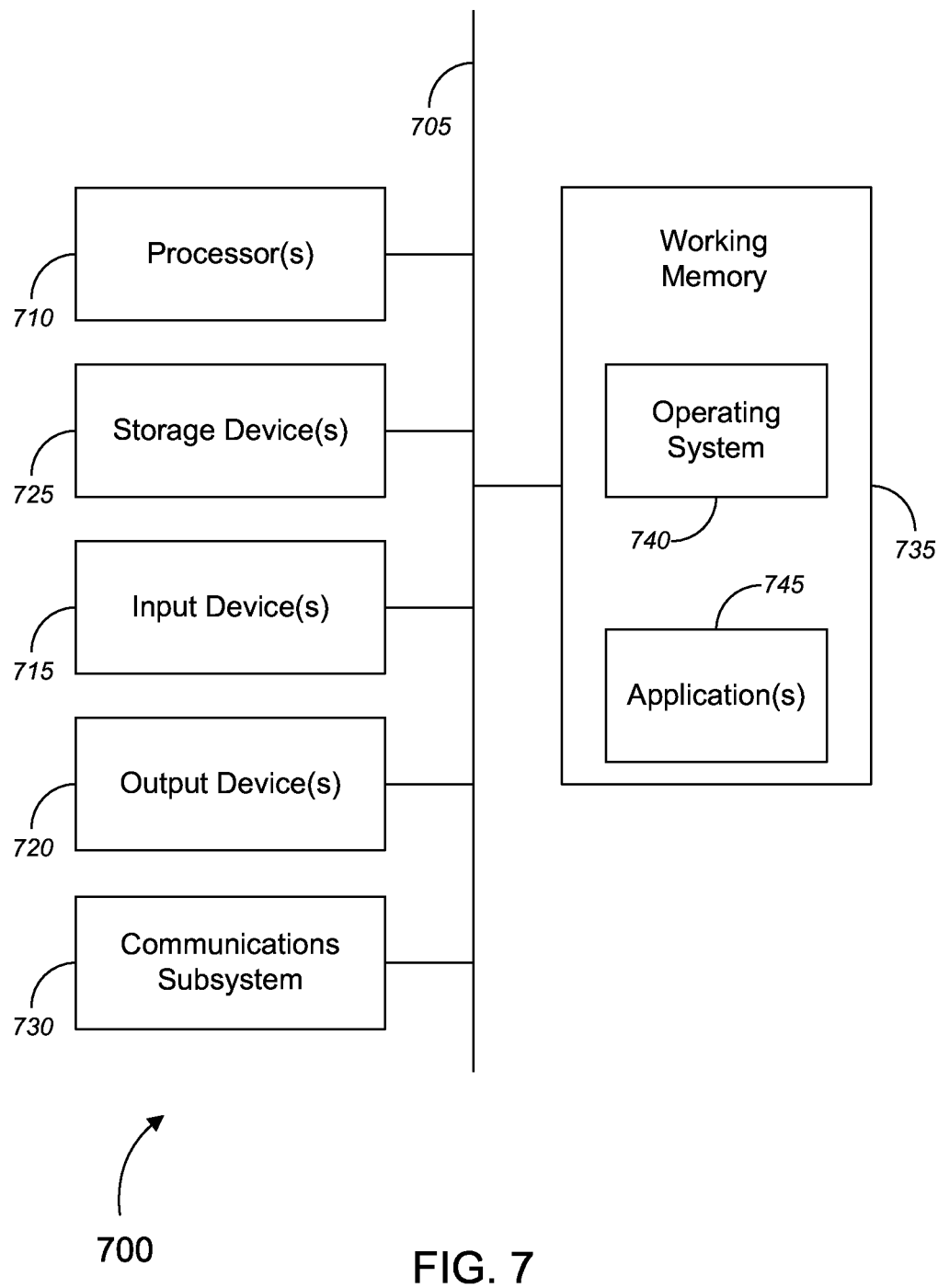
FIG. 7 is a generalized schematic diagram illustrating a computer system, in accordance with various embodiments.

FIG. 7 provides a schematic illustration of one embodiment of a computer system 700 that can perform the methods provided by various other embodiments, as described herein, and/or can function as a computer system, IVR system, etc., as described elsewhere herein. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer systems, and/or with any other devices described herein. In many embodiments, the computer system 700 will further comprise a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operation in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
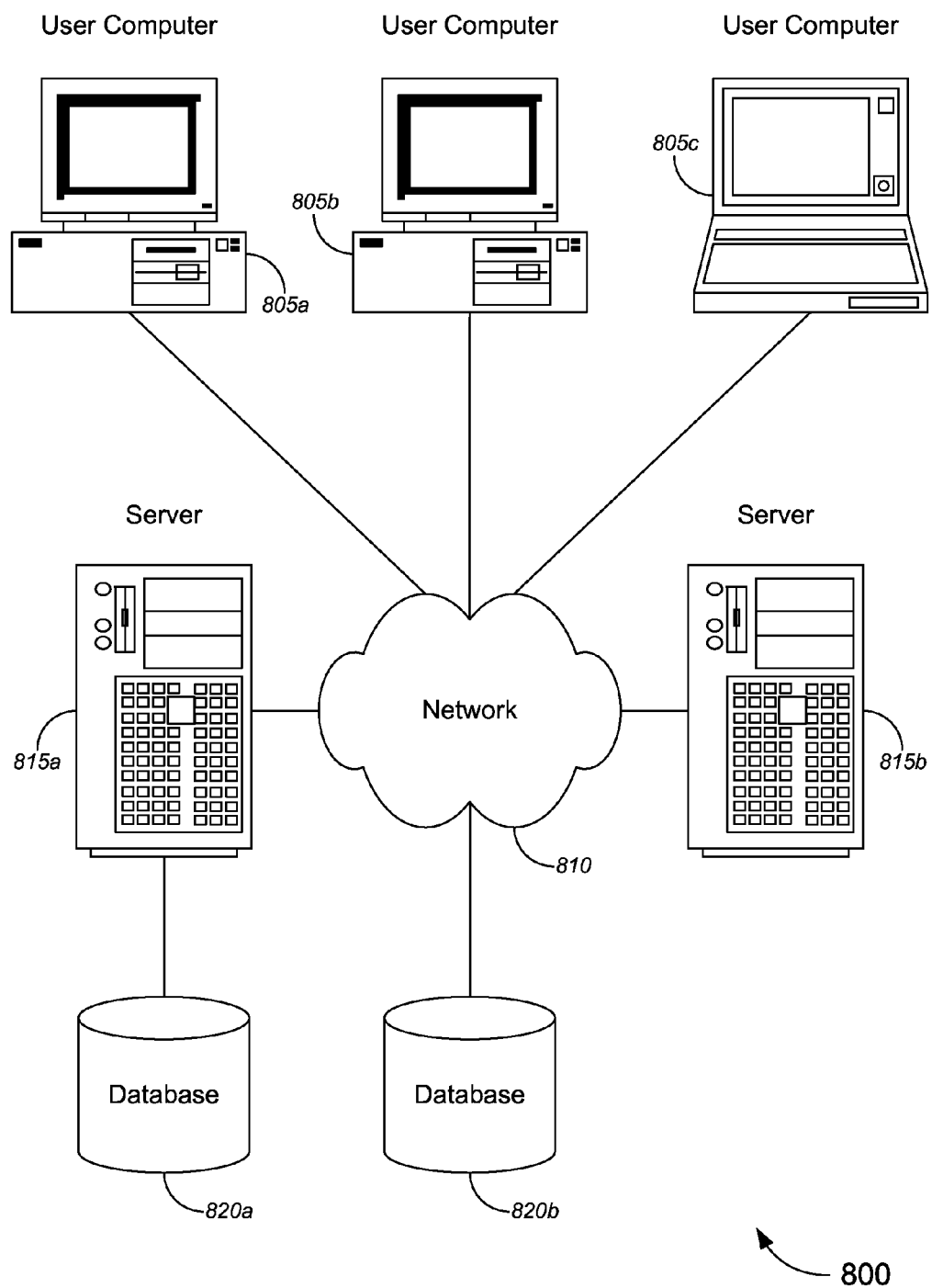
FIG. 8 is a block diagram illustrating a networked system of computers, which can be used in accordance with various embodiments.

As noted above, a set of embodiments comprises systems for optimizing customer interactions. FIG. 8 illustrates a schematic diagram of a system 800 that can be used in accordance with one set of embodiments. The system 800 can include one or more user computers 805. A user computer 805 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 805 can also have any of a variety of applications, including one or more applications configured to perform methods provided by various embodiments (as described above, for example), as well as one or more office applications, database client and/or server applications, and/or web browser applications. Alternatively, a user computer 805 can be any other electronic device, such as a thin-client computer, Internet-enabled mobile telephone, and/or personal digital assistant, capable of communicating via a network (e.g., the network 810 described below) and/or of displaying and navigating web pages or other types of electronic documents. Although the exemplary system 800 is shown with three user computers 805, any number of user computers can be supported.

Certain embodiments operate in a networked environment, which can include a network 810. The network 810 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 810 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 815. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may function as a provider platform, while another server 815 (or the same server) might function as a merchant platform. Yet another server 815 might an IVR unit, while yet another server 815 can function as a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™ IBM™ and the like, which can process requests from clients (including, depending on the configuration, dedicated database clients, API clients, web browsers, etc.) running on a user computer 805 and/or another server 815. In some embodiments, an application server can create web pages dynamically for displaying the information in accordance with various embodiments, such as web pages to provide a customer interface, web pages to provide a user interface for a CSR, web pages to display reports, and/or the like. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system 800 can include one or more databases 820, as mentioned above. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 835 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of optimizing outcomes of interactions with existing customers by optimizing interactive communications systems, the method comprising:
   providing, with an interactive communications system, a customer interface for interacting with customers of a merchant, wherein the merchant is a client of a provider operating the interactive communications system, wherein the interactive communications system comprises at least one of an interactive voice response ("IVR") system, an interactive electronic mail ("email") communications system, an interactive web-based communications system, an interactive electronic chat communications system, or an interactive short message service ("SMS") communications system;
   receiving, at the customer interface, a contact from an existing customer of the merchant;
   identifying the customer at the interactive communications system;
   determining, with the interactive communications system, a status group of the customer, wherein the status group comprises a plurality of customers, each of the plurality of customers in the status group having similar characteristics with each other customer in the status group;
   determining, with the interactive communications system, a preferred outcome that is optimal for the merchant, the preferred outcome comprising at least one of an outcome in which a customer keeps the purchased product, an outcome in which an amount of any refund provided to a customer is minimized, an outcome in which satisfaction of existing customers is maximized, an outcome in which one or more new products are sold to a customer, an outcome in which a partial refund is provided when a customer keeps a product intended for return, an outcome in which one or more additional products are sold to a customer regardless of whether the customer returns previously purchased product, an outcome in which a customer accepts a particular offer, an outcome in which one or more of length, frequency, or communication channel of customer interactions is constrained, an outcome in which a series of prompts most quickly results in customer acceptance of an offer, an outcome in which a customer is encouraged to end telephone interaction and resume interaction via a website, or an outcome in which financial loss for the merchant is minimized;
   automatically selecting, by the interactive communications system, a prompt group for the customer, based at least in part on the status group of the customer and on a set of one or more multivariate testing rules proven to enhance a probability that the customer will accept the preferred outcome that has been determined to be optimal for the merchant;
   automatically presenting, by the interactive communications system using the customer interface, a series of prompts to the customer in accordance with the selected prompt group, each of the prompts providing an offer to the customer, the series of prompts being ordered according to a predefined path wherein the series of prompts comprises varying prompts, and wherein the series of prompts associated with a first prompt group differs from the series of prompts associated with a second prompt group by at least one of order, prompt content, or style of prompt;
   receiving, at the customer interface, an acceptance of an offer corresponding to one of the prompts;
   performing, by the interactive communications system, a fulfillment operation, based on the acceptance of the offer, the fulfillment operation comprising communication of the acceptance of the offer to a merchant computer system operated by the merchant;
   automatically evaluating, by the interactive communications system, the prompt group, based at least in part on the acceptance of the offer, wherein evaluating the prompt group comprises determining an effectiveness of the series of prompts in producing the preferred outcome that has been determined to be optimal for the merchant;
   automatically determining, by the interactive communications system, whether the prompt group is an optimal prompt group to maximize the probability that the customer will accept the outcome that has been determined to be optimal for the merchant, based at least in part on an evaluation of the prompt group;
   automatically modifying, by the interactive communications system, the prompt group, if an evaluation of the prompt group indicates that the series of prompts does not maximize the probability that the customer will accept the preferred outcome that has been determined to be optimal for the merchant, wherein the prompt group is one of a plurality of split test prompt groups and the customer is one of the plurality of customers; and
   automatically repeating iteratively for different customers of the plurality of customers, the operations of:
      automatically selecting, by the interactive communications system, one of the prompt groups for each of the customers;
      automatically presenting, by the interactive communications system, a series of prompts to each customer, in accordance with the selected prompt group, each of the prompts providing an offer to the customer, each series of prompts being ordered according to a different predefined path;
      receiving, from each customer at the interactive communications system, an acceptance of an offer corresponding to one of the prompts;
      automatically evaluating, by the interactive communications system, the prompt group, based at least in part on the acceptance of the offer, to determine an effectiveness of the series of prompts in producing a preferred outcome that has been determined to be optimal for the merchant; and
      automatically modifying, by the interactive communications system, the prompt group, based at least in part on an evaluation of the prompt group;
   wherein automatically evaluating the prompt group comprises automatically comparing, by the interactive communications system, a performance of the split test prompt group with the performance of each of the plurality of split test prompt groups to optimize performance of the interactive communications system in interacting with customers;
   wherein a first prompt group comprises a first prompt in a first series of prompts and a second prompt group comprises a second prompt in a second series of prompts, and wherein the first prompt and the second prompt provide the same offer to the customer, and the first prompt is ordered differently in the first series of prompts compared with an order of the second prompt in the second series of prompts.

2. A method of optimizing outcomes of interactions with customers by optimizing interactive communications systems, the method comprising:
    providing, by an interactive communications system, a customer interface for interacting with customers of a merchant;
    receiving, at the customer interface, a contact from a customer of the merchant;
    identifying the customer at the interactive communications system;
    determining, by the interactive communications system, a status group of the customer, wherein the status group comprises a plurality of customers, each of the plurality of customers in the status group having similar characteristics with each other customer in the status group;
    automatically selecting, by the interactive communications system, a prompt group for the customer, based at least in part on the status group of the customer;
    automatically presenting, by the interactive communications system using the customer interface, a series of prompts to the customer in accordance with the selected prompt group, each of the prompts providing an offer to the customer, the series of prompts being ordered according to a predefined path, wherein the series of prompts comprises varying prompts, and wherein the series of prompts associated with a first prompt group differs from the series of prompts associated with a second prompt group by at least one of order, prompt content, or style of prompt;
    receiving, at the customer interface, an acceptance of an offer corresponding to one of the prompts;
    performing, by the interactive communications system, a fulfillment operation, based on the acceptance of the offer;
    automatically evaluating, by the interactive communications system, the prompt group, based at least in part on the acceptance of the offer, to determine an effectiveness of the series of prompts in producing a preferred outcome that has been determined to be optimal for the merchant, the preferred outcome comprising at least one of an outcome in which a customer keeps the purchased product, an outcome in which an amount of any refund provided to a customer is minimized, an outcome in which satisfaction of existing customers is maximized, an outcome in which one or more new products are sold to a customer, an outcome in which a partial refund is provided when a customer keeps a product intended for return, an outcome in which one or more additional products are sold to a customer regardless of whether the customer returns previously purchased product, an outcome in which a customer accepts a particular offer, an outcome in which one or more of length, frequency, or communication channel of customer interactions is constrained, an outcome in which a series of prompts most quickly results in customer acceptance of an offer, an outcome in which a customer is encouraged to end telephone interaction and resume interaction via a website, or an outcome in which financial loss for the merchant is minimized;
    automatically modifying, by the interactive communications system, the prompt group, based at least in part on an evaluation of the prompt group, wherein the prompt group is one of a plurality of split test prompt groups and the customer is one of the plurality of customers; and
    automatically repeating iteratively for different customers of the plurality of customers, the operations of:
        automatically selecting, by the interactive communications system, one of the prompt groups for each of the customers;
        automatically presenting, by the interactive communications system, a series of prompts to each customer, in accordance with the selected prompt group, each of the prompts providing an offer to the customer, each series of prompts being ordered according to a different predefined path;
        receiving, from each customer at the interactive communications system, an acceptance of an offer corresponding to one of the prompts;
        automatically evaluating, by the interactive communications system, the prompt group, based at least in part on the acceptance of the offer, to determine an effectiveness of the series of prompts in producing a preferred outcome that has been determined to be optimal for the merchant; and
        automatically modifying, by the interactive communications system, the prompt group, based at least in part on an evaluation of the prompt group;
    wherein automatically evaluating the prompt group comprises automatically comparing, by the interactive communications system, a performance of the split test prompt group with the performance of each of the plurality of split test prompt groups to optimize performance of the interactive communications system in interacting with customers;
    wherein a first prompt group comprises a first prompt in a first series of prompts and a second prompt group comprises a second prompt in a second series of prompts, and wherein the first prompt and the second prompt provide the same offer to the customer, and the first prompt is ordered differently in the first series of prompts compared with an order of the second prompt in the second series of prompts.

3. The method of claim 2, wherein the interactive communications system evaluates the prompt group automatically without user input.

4. The method of claim 2, wherein the customer is an existing customer of the merchant, a new customer of the merchant, or a potential customer of the merchant.

5. The method of claim 2, wherein each of the plurality of split test prompt groups includes the same series of prompts, and wherein the series of prompts is ordered differently in each prompt group.

6. The method of claim 2, wherein each of the plurality of split test prompt groups includes at least one prompt different from at least one other of the plurality of split test prompt groups.

7. The method of claim 2, wherein the first prompt delivers the offer to the customer in a first style and the second prompt delivers the offer to the customer in a second style.

8. The method of claim 7, wherein the first style employs different verbiage from the second style.

9. The method of claim 7, wherein the first style employs a different voice from the second style.

10. The method of claim 7, wherein the first style employs a different intonation from the second style.

11. The method of claim 2, wherein modifying the prompt group comprises selecting one of the plurality of prompt groups as an optimal prompt group for the status group of which the customer is a member.

12. The method of claim 2, further comprising: determining, by the interactive communications system, the preferred outcome for the interaction with the customer.

13. The method of claim 12, wherein the one or more characteristics of the customer include one or more characteristics selected from the group consisting of: a type of the customer, a source of the customer, an age of an account of the customer, a status of an account of the customer, a purchase history of the customer, and demographic information about the customer.

14. The method of claim 12, wherein determining the preferred outcome further comprises determining the preferred outcome based at least in part on predefined preferences of the merchant.

15. The method of claim 2, wherein performing a fulfillment operation comprises:
   interfacing with a computer system of the merchant; and
   communicating the nature of the accepted offer to the computer system of the merchant.

16. The method of claim 2, wherein at least one of the prompts requires the customer to decline or accept a particular offer.

17. The method of claim 2, wherein at least one of the prompts requires the customer to select from among a plurality of offers.

18. The method of claim 2, further comprising:
   maintaining a database of customers of the merchant, the database comprising a plurality of customer records, including a first customer record for the customer of the merchant;
   wherein determining a status group of the customer comprises identifying a status of the customer based on analysis of information in the first customer record against business rules specific to the merchant.

19. The method of claim 18, further comprising:
   identifying, in the database, a plurality of customers with similar characteristics; and
   assigning different status markers to each of the plurality of customers.

20. The method of claim 2, wherein the customer interface is an interactive voice response ("IVR") interface, and wherein the prompts are audible prompts.

21. The method of claim 2, wherein the customer interface is a web interface.

22. The method of claim 2, wherein the customer interface is an electronic mail interface.

23. The method of claim 2, wherein the customer interface is an electronic chat interface.

24. The method of claim 2, wherein the customer interface is a short message service ("SMS") interface.

25. The method of claim 2, wherein the customer interface is one of a plurality of customer interfaces, the plurality of customer interfaces comprising an interactive voice response ("IVR") interface, a web interface, and an email or chat or short message service ("SMS") interface, and wherein the interactive communications system presents the same series of prompts in each of the customer interfaces.

26. The method of claim 2, further comprising:
   automatically analyzing, by the interactive communications system, outcomes of a plurality of customer interactions employing a plurality of prompt groups; and
   automatically generating, by the interactive communications system, a report comprising statistical comparisons of an effectiveness of each of the plurality of prompt groups at obtaining an outcome that has been determined to be optimal for the merchant.

27. An interactive communications device comprising at least one of an interactive voice response ("IVR") system, an interactive electronic mail ("email") communications system, an interactive web-based communications system, an interactive electronic chat communications system, or an interactive short message service ("SMS") communications system, the interactive communications device comprising:
   at least one processor;
   a non-transitory computer readable medium having encoded thereon a set of instructions executable by the at least one processor to cause the interactive communications device to provide a customer interface for interacting with customers of a merchant;
   receive, at the customer interface, a contact from a customer of the merchant;
   identify the customer;
   determine a status group of the customer,
   wherein the status group comprises a plurality of customers, each of the plurality of customers in the status group having similar characteristics with each other customer in the status group;
   automatically select a prompt group for the customer, based at least in part on the status group of the customer;
   automatically present, with the customer interface, a series of prompts to the customer in accordance with the selected prompt group, each of the prompts providing an offer to the customer, the series of prompts being ordered according to a predefined path, wherein the series of prompts comprises varying prompts, and wherein the series of prompts associated with a first prompt group differs from the series of prompts associated with a second prompt group by at least one of order, prompt content, or style of prompt;
   receive, with the customer interface, an acceptance of an offer corresponding to one of the prompts;
   perform a fulfillment operation, based on the acceptance of the offer;
   automatically evaluate the prompt group, based at least in part on the acceptance of the offer, to determine an effectiveness of the series of prompts in producing a preferred outcome that has been determined to be optimal for the merchant, the preferred outcome comprising at least one of an outcome in which a customer keeps the purchased product, an outcome in which any amount of any refund provided to a customer is minimized, an outcome in which satisfaction of existing customers is maximized, an outcome in which one or more new products are sold to a customer, an outcome in which a partial refund is provided when a customer keeps a product intended for return, an outcome in which one or more additional products are sold to a customer regardless of whether the customer returns previously purchased product, an outcome in which a customer accepts a particular offer, an outcome in which one or more of length, frequency, or communication channel of customer interactions is constrained, an outcome in which a series of prompts most quickly results in customer acceptance of an offer, an outcome in which a customer is encouraged to end telephone interaction and resume interaction via a website, or an outcome in which financial loss for the merchant is minimized;
   automatically modify the prompt group, based at least in part on an evaluation of the prompt group, wherein the prompt group is one of a plurality of split test prompt groups and the customer is one of the plurality of customers; and automatically repeat iteratively for different customers of the plurality of customers, the operations of:
automatically selecting one of the prompt groups for each of the customers;
automatically presenting a series of prompts to each customer, in accordance with the selected prompt group, each of the prompts providing an offer to the customer, each series of prompts being ordered according to a different predefined path;
receiving, from each customer, an acceptance of an offer corresponding to one of the prompts;
automatically evaluating the prompt group, based at least in part on the acceptance of the offer, to determine an effectiveness of the series of prompts in producing a preferred outcome that has been determined to be optimal for the merchant; and
automatically modifying the prompt group, based at least in part on an evaluation of the prompt group;
wherein instructions for automatically evaluating the prompt group comprises instructions for automatically comparing a performance of the split test prompt group with the performance of each of the plurality of split test prompt groups to optimize performance of the interactive communications system in interacting with customers;
wherein a first prompt group comprises a first prompt in a first series of prompts and a second prompt group comprises a second prompt in a second series of prompts, and wherein the first prompt and the second prompt provide the same offer to the customer, and the first prompt is ordered differently in the first series of prompts compared with an order of the second prompt in the second series of prompts.

28. An interactive communications system comprising at least one of an interactive voice response ("IVR") system, an interactive electronic mail ("email") communications system, an interactive web-based communications system, an interactive electronic chat communications system, or an interactive short message service ("SMS") communications system, the interactive communications system comprising:
one or more processors;
a customer interface, in communication with the one or more processors, for interfacing with existing customers of a merchant; and
a computer readable medium in communication with the one or more processors, the computer readable medium having encoded thereon a set of instructions executable by the one or more processors to cause the interactive communications system to:
receive, at the customer interface, a contact from a customer of the merchant;
identify the customer;
determine a status group of the customer, wherein the status group comprises a plurality of customers, each of the plurality of customers in the status group having similar characteristics with each other customer in the status group;
automatically select a prompt group for the customer, based at least in part on the status group of the customer;
automatically present, with the customer interface, a series of prompts to the customer in accordance with the selected prompt group, each of the prompts providing an offer to the customer, the series of prompts being ordered according to a predefined path, wherein the series of prompts comprises varying prompts, and wherein the series of prompts associated with a first prompt group differs from the series of prompts associated with a second prompt group by at least one of order, prompt content, or style of prompt;
receive, with the customer interface, an acceptance of an offer corresponding to one of the prompts;
perform a fulfillment operation, based on the acceptance of the offer;
automatically evaluate the prompt group, based at least in part on the acceptance of the offer, to determine an effectiveness of the series of prompts in producing a preferred outcome that has been determined to be optimal for the merchant, the preferred outcome comprising at least one of an outcome in which a customer keeps the purchased product, an outcome in which any amount of any refund provided to a customer is minimized, an outcome in which satisfaction of existing customers is maximized, an outcome in which one or more new products are sold to a customer, an outcome in which a partial refund is provided when a customer keeps a product intended for return, an outcome in which one or more additional products are sold to a customer regardless of whether the customer returns previously purchased product, an outcome in which a customer accents a particular offer, an outcome in which one or more of length, frequency, or communication channel of customer interactions is constrained, an outcome in which a series of prompts most quickly results in customer acceptance of an offer, an outcome in which a customer is encouraged to end telephone interaction and resume interaction via a website, or an outcome in which financial loss for the merchant is minimized;
automatically modify the prompt group, based at least in part on an evaluation of the prompt group, wherein the prompt group is one of a plurality of split test prompt groups and the customer is one of the plurality of customers; and
automatically repeat iteratively for different customers of the plurality of customers, the operations of:
automatically selecting one of the prompt groups for each of the customers;
automatically presenting a series of prompts to each customer, in accordance with the selected prompt group, each of the prompts providing an offer to the customer, each series of prompts being ordered according to a different predefined path;
receiving, from each customer, an acceptance of an offer corresponding to one of the prompts;
automatically evaluating the prompt group, based at least in part on the acceptance of the offer, to determine an effectiveness of the series of prompts in producing a preferred outcome that has been determined to be optimal for the merchant; and
automatically modifying the prompt group, based at least in part on an evaluation of the prompt group;
wherein instructions for automatically evaluating the prompt group comprises instructions for automatically comparing a performance of the split test prompt group with the performance of each of the plurality of split test prompt groups to optimize performance of the interactive communications system in interacting with customers;
wherein a first prompt group comprises a first prompt in a first series of prompts and a second prompt group comprises a second prompt in a second series of prompts, and wherein the first prompt and the second prompt provide the same offer to the customer, and the first prompt is ordered differently in the first series of prompts compared with an order of the second prompt in the second series of prompts.

* * * * *